May 28, 1940.  S. ELIOT  2,202,689
MOTOR VEHICLE
Filed Nov. 8, 1938  3 Sheets-Sheet 1
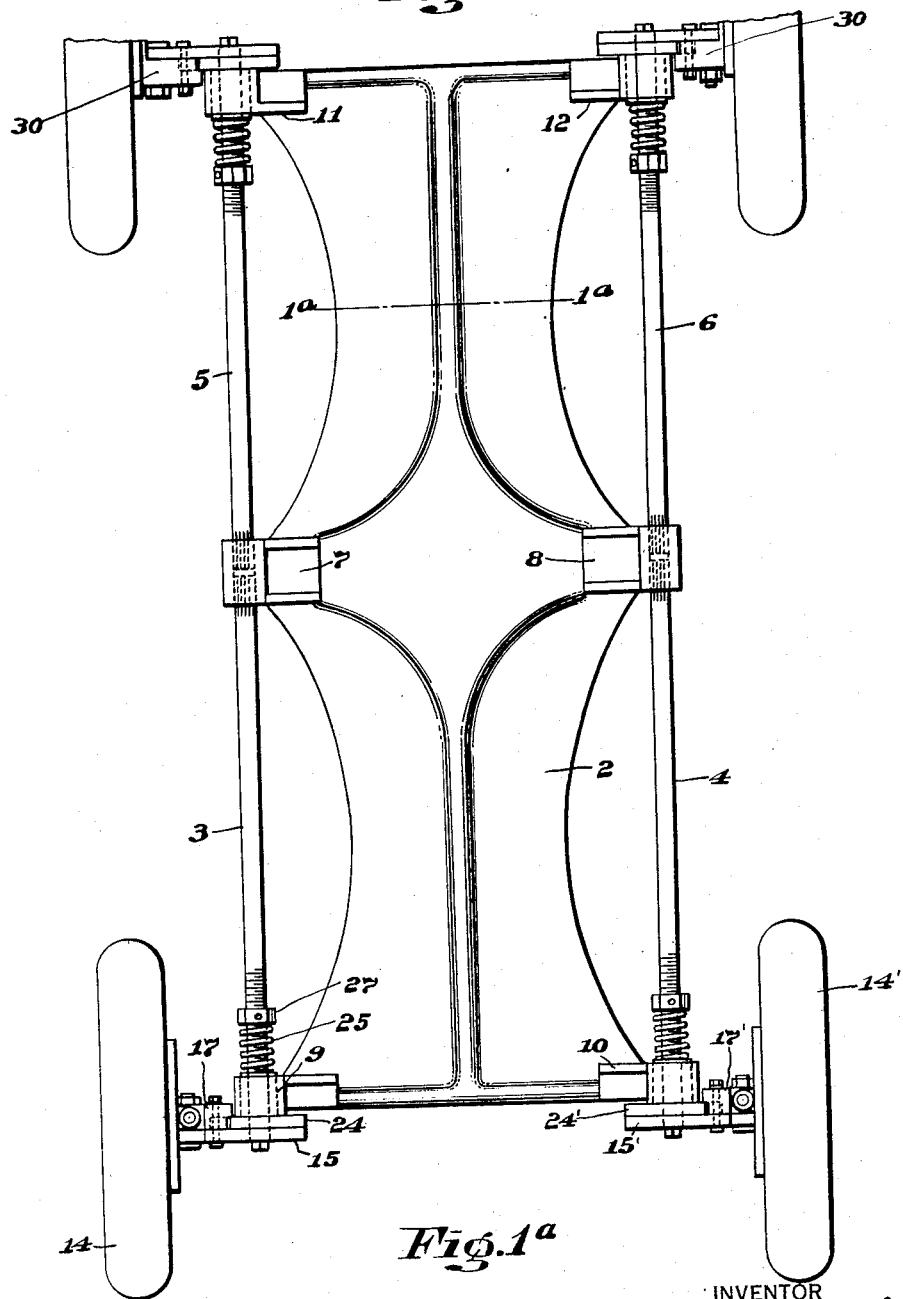

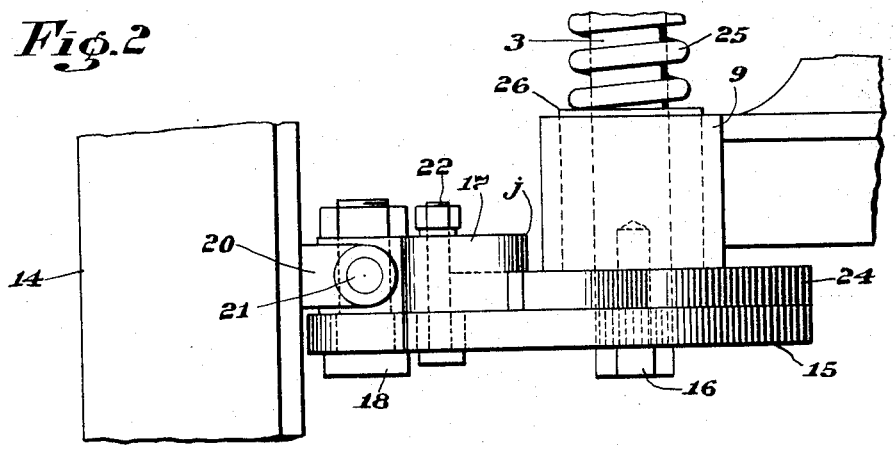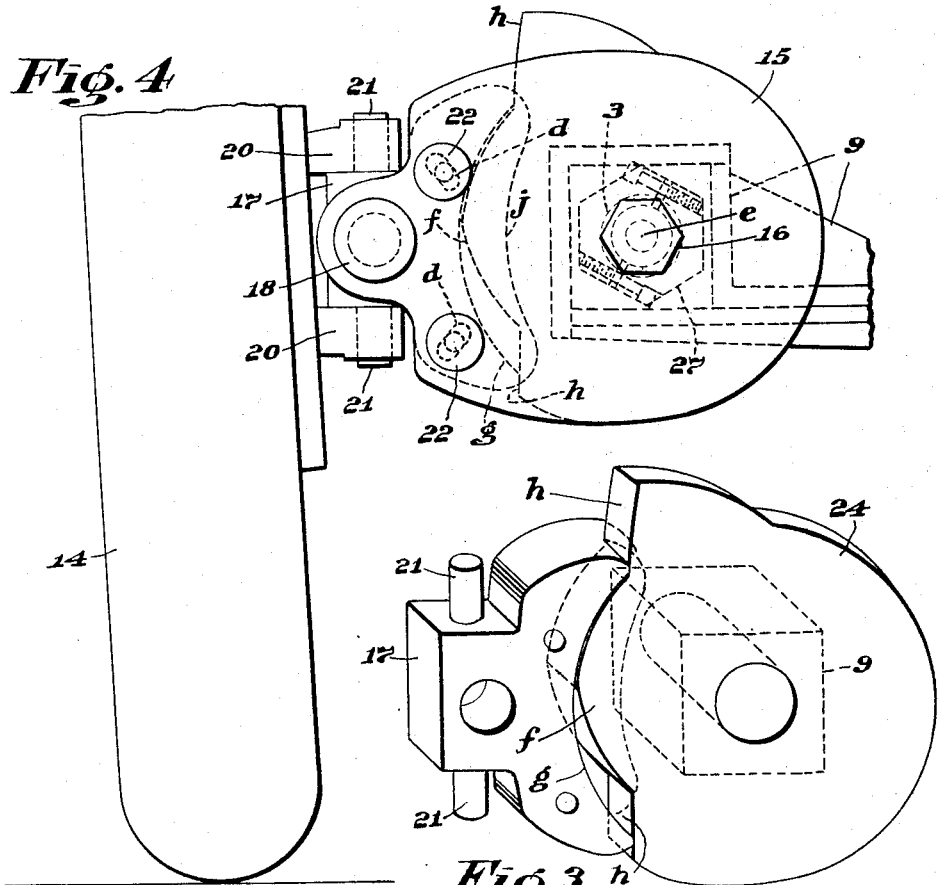

May 28, 1940.  S. ELIOT  2,202,689
MOTOR VEHICLE
Filed Nov. 8, 1938     3 Sheets-Sheet 3
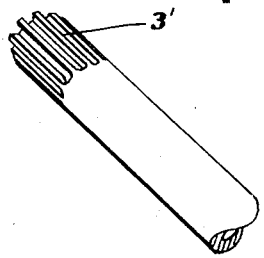
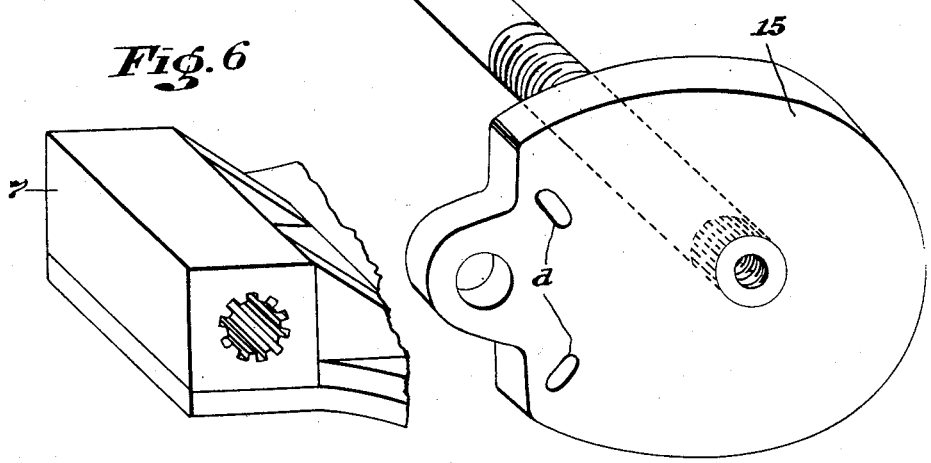
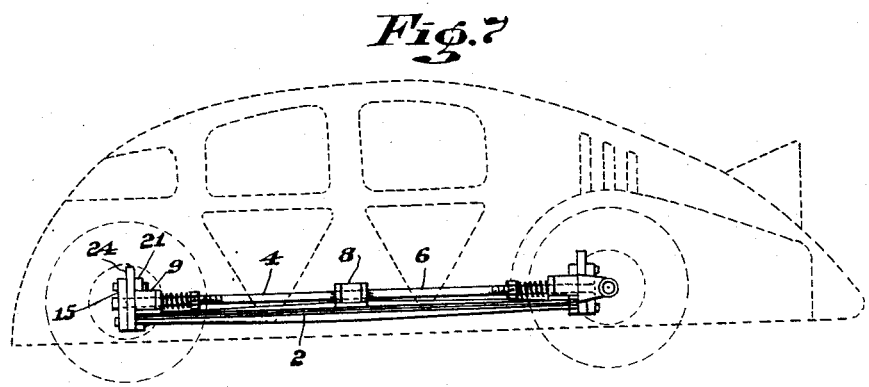
INVENTOR
Samuel Eliot,
BY
ATTORNEY Patented May 28, 1940

2,202,689

UNITED STATES PATENT OFFICE 2,202,689

MOTOR VEHICLE

Samuel Eliot, Newton, Mass.

Application November 8, 1938, Serial No. 239,427

12 Claims. (Cl. 267—57)

This invention relates to the chassis structure of motor vehicles. It has for its chief object to simplify the construction of this portion of the vehicle, and more especially the frame and the mounting of the frame on the wheels; to reduce the expense of manufacture of these parts, and to provide an exceptionally sturdy and reliable construction having easy riding qualities.

The nature of the invention will be readily understood from the following description when read in connection with the accompanying drawings, and the novel features will be particularly pointed out in the appended claims.

In the drawings,

Figure 1 is a plan view of those parts of a motor vehicle chassis with which this invention is more especially concerned and illustrating one embodiment of the invention;

Fig. 1a is a sectional view approximately on the line a—a, Fig. 1;

Fig. 2 is a plan view on a larger scale showing the parts at the right-hand lower corner of Fig. 1;

Fig. 3 is a perspective view of certain of these parts;

Fig. 4 is a front elevation of the parts shown in Fig. 2;

Figs. 5 and 6 are perspective views illustrating certain details of the construction; and Fig. 7 is a side elevation, somewhat diagrammatic in character, illustrating a car embodying features of this invention.

Referring first to Fig. 1, the structure there shown comprises a chassis frame of a novel form consisting essentially of a wide, relatively flat, horizontal member 2 forming the main part of the frame and extending approximately the entire length of the wheel base. While it may be made by various methods, a satisfactory construction comprises two flat plates b and c, Fig. 1a, with longitudinal ribs pressed in them, the plates being welded together so that to all intents and purposes they form a single integral structure. The ribbed portions extending longitudinally form the backbone of the frame and they are so arranged as to provide the necessary strength, stiffness and resistance to torsional strains.

The four wheels are connected to the frame through torsion rods or tubes indicated, respectively, at 3, 4, 5 and 6. As will be evident from an inspection of Fig. 1, the rods are arranged in two pairs extending, respectively, toward the front and rear of the frame, the individual rods of each pair being located at opposite edges of the frame. Preferably the frame is provided at approximately the center thereof, or at some other intermediate point, with brackets 7 and 8 in which the adjacent ends of the rods at opposite sides of the frame are anchored. One of these brackets is shown in Fig. 6. It is provided with sockets to receive the splined ends of the bars. At each of the four corners of the frame 2 bearing brackets 9, 10, 11 and 12 are mounted to receive and journal the torsion bars adjacent to their free ends.

An important feature of the invention resides in the connections between each wheel and its respective torsion bar or tube. These connections for the wheel 14, Fig. 1, are shown on a larger scale in Figs. 2, 3 and 4. Referring to said figures, it will be observed that the forward end of the torsion bar 3 is splined to a plate 15 which, in this instance, also performs the functions of a link. A nut or bolt 16 secures the plate against the end of said bar. Mounted immediately behind this plate is an ear 17 which is connected with the plate 15 by a horizontal pivot pin 18 and the ear is also connected with the steering spindle 20 for the wheel 14 by the king pin pivots 21—21. Preferably the axes of these pivots 18 and 21 intersect each other. The steering spindle, of course, is designed for connection to the steering mechanism but such connections are not here shown since they have no bearing on this invention. In addition to the pivot 18, bolts 22—22 hold the ear 17 and the plate 15 together, the bolts working in slots d—d formed in the plate and both struck about the axis of the pivot 18. Immediately behind the plate 15 and bearing against it is another plate 24 welded or otherwise secured rigidly to the frame.

It will be evident from an inspection of Fig. 4 that when the load on the frame 2 is increased, the axis e of the torsion bar 3 will drop to a lower position. The whole frame may move down with it. The axis of the horizontal pivot 18 will not move substantially. Consequently, the plate or link 15 will be swung in a clockwise direction about the pivot 18. This action will produce a rotative movement of the torsion bar 3 around its own axis, and the depression or lowering movement of this corner of the frame will be resisted by the inherent torsional resistance of the bar. While such action is desirable for easy riding qualities, it is also desirable to limit this movement and to arrest it gradually. For this reason the left-hand face, Fig. 4, of the stationary plate 24 is provided with a cam-like projection f, best shown in Fig. 3, and the adjacent edge of the ear 17 is cut away, as shown at g, to receive or accommodate this projection. Thus as the chassis frame 2 moves downward and upward relatively to the wheel 14, these movements will be limited by the engagement of the cam projection f with the upper or lower portions of the wall g. Such relative movements of the plate 15 and ear 17 about the axis of the pivot 18 also are limited by the bolts 22—22 working in the slots d—d.

Since the wheel 14 revolves on the spindle bracket 20 (more commonly called the steering spindle) and this member, in turn, is connected with the link 15 by the horizontal pivot 18 which extends approximately parallel to the chassis frame, the wheel would be free to tip laterally toward and from the frame if some provision were not made to control it. Such provision consists of surfaces h—h, Figs. 3 and 4, formed on the left-hand face of the stationary plate 24, and the fact that these two faces are constantly engaged, respectively, by the upper and lower end portions of the ear 17. By properly developing the surfaces h—h the lateral tipping movement of the wheel may be so controlled that it will be held constantly in the approximately vertical position in which it should be maintained notwithstanding the vertical movements of the vehicle frame or body.

Preferably the ear 17 also is provided with a portion j extending laterally beyond the surface j and behind the left-hand edge of the plate 24 so that it cooperates with both plates 15 and 24 in resisting any tendency to bend the wheel support in a horizontal plane out of its right angle relationship to the torsion bar 3 and the frame.

The plates 15 and 24 also are preferably utilized to act as shock absorbers. For this reason a strong coiled spring 25 encircles the torsion bar 3 and is positioned just behind the bearing bracket 9 for the bar, the forward end of this spring abutting against a washer 26 and its rearward end against a nut 27 threaded on said shaft. This spring, therefore, exerts a constant rearward thrust on the bar which holds the plate 15 in face to face engagement with the stationary plate 24 and the friction so produced resists those forces tending to rotate the bar 3, and thus absorbs a substantial part of the shock which otherwise would be transmitted from the wheel to the frame. It also checks the rebound of the body or the wheel. By adjusting the nut 27 the degree of shock absorbing action can be varied to suit the requirements of the load or the characteristics of the vehicle. The fit of the splined end 3' of the torsion bar in its bearing 7 should be such as to provide the freedom of axial movement of the bar necessary for this shock absorbing action. The nut 27 may be locked in its adjusted position by the bolts 31.

This construction is duplicated at the opposite side of the vehicle to support the other front wheel 14'. Also, the same construction, except only for the absence of the king pins, may be used in supporting the rear wheels. Here the wheel bearing bracket and the part 17 may be combined in a single supporting structure 30, Fig. 1, which performs both functions. Naturally, the design of the rear end will depend largely on the nature of the drive used, but the independent mounting of the rear wheels, as shown, can be used with several well known forms of rear wheel drives.

It will thus be seen that the invention provides a motor vehicle chassis of exceptionally simple construction which, at the same time, is sturdy and can be manufactured economically. It makes the use of a front axle unnecessary and with some kinds of transmissions eliminates also the requirements for a rear axle. The connections between the wheels and the torsion bars are such as to provide both the springing and the shock absorbing action necessary for easy riding. Unsprung weight is reduced to a minimum, and the design lends itself conveniently to the production of a low hung frame with a low center of gravity. If a torsion bar should break, the corner of the frame supported by the wheel associated with it could drop only a short distance before it would be stopped in the manner above described. Thus a safe and reliable construction is provided. The design of the frame is particularly valuable in connection with the use of torsion bar springing because this type of springing subjects the frame to unusual strains and sets up stresses which the usual frame structures are not adapted to resist. The invention solves this problem effectively in a very simple way.

It should be noted that the part 15 acts both as a link in transmitting motion from the wheel support 20 to the torsion bar or tube 3, and also, because of its cooperation with the plate 24, as a shock absorbing plate. Any suitable provision may be made for lubricating the friction surfaces of the connections between each wheel and its respective torsion bar and some or all of these parts may be enclosed in a boot or casing, if desired.

While I have herein shown and described a typical embodiment of my invention, it will be evident that the invention may be embodied in other forms without departing from the spirit or scope thereof.

Having thus described my invention, what I desire to claim as new is:

1. In a vehicle, the combination of a chassis frame, a wheel, a steering spindle on which said wheel is mounted, a torsion bar supported in the frame and secured at one end against rotation relatively thereto, a link rigidly secured to the opposite end of said bar and connected with said spindle for relative pivotal movement about both vertical and horizontal axes, and means cooperating with said link to control the movement of said spindle about said horizontal axis.

2. In a vehicle, the combination of a chassis frame, a wheel, a steering spindle on which said wheel is mounted, a torsion bar supported in the frame and secured at one end against rotation relatively thereto, a link rigidly secured to the opposite end of said bar, and means connecting said link and spindle together including an ear connected with said link by a horizontal pivot extending approximately parallel to the frame so that the wheel can tip laterally toward and from the frame but relative vertical movements of said wheel and frame will be resiliently resisted by said bar, and means carried by the frame and cooperating with said ear so as to control said lateral tipping movement of the wheel as to hold it constantly in an approximately upright position.

3. In a vehicle, the combination of a chassis frame, a wheel, a steering spindle on which said wheel is mounted, a torsion bar supported in the frame and secured at one end against rotation relatively thereto, a link rigidly secured to the opposite end of said bar and means connecting said link and spindle together including an ear connected with said link by a horizontal pivot extending approximately parallel to the frame so that the wheel can tip laterally toward and from the frame but relative vertical movements of said wheel and frame will be resiliently resisted by said bar, and a cam rigid with said frame and cooperating with said ear so to control said tipping movement of said wheel as to hold it constantly in an approximately upright position.

4. In a vehicle, the combination of a chassis frame, a wheel, a steering spindle on which said wheel is mounted, a torsion bar supported in the frame and secured at one end against rotation relatively thereto, a plate secured rigidly to the opposite end of said bar and connected by a horizontal pivot with said spindle so that relative vertical movements of said wheel and frame will be transmitted to and resisted by said bar, a second plate fast on said frame and in face to face contact with the first plate, and means for holding said plates yieldingly pressed against each other.

5. In a vehicle, the combination of a chassis frame, a wheel, a steering spindle on which said wheel is mounted, a torsion bar supported in the frame and secured at one end against rotation relatively thereto, a plate rigidly secured to the opposite end of said bar, an ear connected with said plate by a horizontal pivot and with said spindle by a vertical pivot, and means limiting the movement of said ear relatively to said frame.

6. In a vehicle, the combination of a chassis frame, a wheel, a steering spindle on which said wheel is mounted, a torsion bar supported in the frame and secured at one end against rotation relatively thereto, a plate rigidly secured to the opposite end of said bar, an ear connected with said plate by a horizontal pivot and with said spindle by a vertical pivot, and means limiting the movement of said ear relatively to said frame, said means including a plate rigid with said frame and bearing against the first mentioned plate, and means holding said plates constantly pressed in face to face engagement with each other.

7. In a vehicle, the combination of a chassis frame, a wheel, a steering spindle on which said wheel is mounted, a torsion bar supported in the frame and secured at one end against rotation relatively thereto, a link rigidly secured to the opposite end of said bar, an ear connected with said spindle by a king pin and with said link by a horizontal pivot extending approximately parallel to the frame so that the ear can tip laterally toward and from the frame, means for limiting said lateral tipping movement comprising a cam plate cooperating with said ear and mounted fast on said frame in face to face engagement with said link, the link also being in the form of a plate, and a spring acting through said bar to force the latter plate constantly against the cam plate.

8. In a vehicle, the combination of a chassis frame, a torsion bar mounted in said frame and secured at one end against turning but journaled for rotation about its axis at the opposite end, a wheel, a support for said wheel, a plate secured on the latter end of said bar, an ear secured to said wheel support, a pivot connecting said ear with said plate so that relative vertical movements of said frame and wheel will operate through said plate to rotate said bar around its own axis against the torsional resistance of the bar, and means for so limiting the relative movements of said ear and frame as to support the frame on said wheel in the event that the torsion bar breaks.

9. In a vehicle, the combination of a chassis frame, a torsion bar mounted in said frame and secured at one end against turning but journaled for rotation about its axis at the opposite end, a wheel, a support for said wheel, a plate secured on the latter end of said bar, an ear secured to said wheel support, a pivot connecting said ear with said plate so that relative vertical movements of said frame and wheel will operate through said plate to rotate said bar around its own axis against the torsional resistance of the bar, and means rigid with said frame and cooperating with said ear to limit the relative vertical movements of said ear and frame.

10. In a vehicle, the combination of a chassis frame, a torsion bar mounted in said frame and secured at one end against turning but journaled for rotation about its axis at the opposite end, a wheel, a support for said wheel, a plate secured on the latter end of said bar, an ear secured to said wheel support, a pivot connecting said ear with said plate so that relative vertical movements of said frame and wheel will operate through said plate to rotate said bar around its own axis against the torsional resistance of the bar, and additional means connecting said plate and said ear together and serving to limit the movements of one relatively to the other.

11. In a vehicle, the combination of a chassis frame, a torsion bar mounted in said frame and secured at one end against turning but journaled for rotation about its axis at the opposite end, a wheel, support for said wheel, a plate secured on the latter end of said bar, an ear secured to said wheel support, a pivot connecting said ear with said plate so that relative vertical movements of said frame and wheel will operate through said plate to rotate said bar around its own axis against the torsional resistance of the bar, a plate rigid with said frame, and means acting through said bar to hold said plates constantly pressed in face to face engagement with each other to resist frictionally their relative movements about the axis of said bar.

12. In a vehicle, the combination of a chassis frame, a wheel, a steering spindle on which said wheel is mounted, a torsion bar supported in the frame and secured at one end against rotation relatively thereto, a link rigidly secured to the opposite end of said bar, an ear connected with said spindle by a king pin and with said link by a horizontal pivot extending approximately parallel to the frame so that the ear can tip laterally toward and from the frame, the axes of said pivot and king pin intersecting each other, and means for limiting said lateral tipping movement so as to hold said wheel constantly in an approximately upright position.

SAMUEL ELIOT.